(12) United States Patent
Prescott et al.

(10) Patent No.: US 8,960,709 B2
(45) Date of Patent: Feb. 24, 2015

(54) CARRIER INSERT BAR ASSEMBLY WITH SECUREMENT PIN

(75) Inventors: Keith L. Prescott, Cambridge, VT (US); Kevin S. Bogoslofski, Southington, CT (US); John Laverack, Southbury, CT (US); Greg G. Weaver, Waterbury, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 13/562,561

(22) Filed: Jul. 31, 2012

(65) Prior Publication Data

US 2013/0033021 A1 Feb. 7, 2013

Related U.S. Application Data

(60) Provisional application No. 61/513,979, filed on Aug. 1, 2011.

(51) Int. Cl.
*B60D 1/00* (2006.01)
*B60D 1/52* (2006.01)

(52) U.S. Cl.
CPC ........................................ *B60D 1/52* (2013.01)
USPC .......................................... 280/507; 280/515

(58) Field of Classification Search
USPC .................. 280/507, 515, 506, 504
See application file for complete search history.

(56) References Cited

U.S. PATENT DOCUMENTS

| | | | | |
|---|---|---|---|---|
| 1,448,950 | A * | 3/1923 | Uecker | 280/508 |
| 3,326,575 | A * | 6/1967 | Shepley | 280/515 |
| 4,389,058 | A * | 6/1983 | Cadwell | 280/416.2 |
| 4,394,031 | A * | 7/1983 | Barton et al. | 280/515 |
| 4,431,207 | A * | 2/1984 | Langenfeld et al. | 280/416.2 |
| 4,484,760 | A * | 11/1984 | Rach | 280/477 |
| 5,193,838 | A * | 3/1993 | Olson | 280/515 |
| 7,347,441 | B2 * | 3/2008 | Rosario | 280/507 |

* cited by examiner

*Primary Examiner* — Kevin Hurley
*Assistant Examiner* — Michael Stabley
(74) *Attorney, Agent, or Firm* — Novak Druce Connolly Bove + Quigg LLP

(57) ABSTRACT

An insert bar assembly for a hitch-rack carrier comprises a self-locating securement pin. The insert bar assembly can comprise an elongate hitch-attachment bar which in turn comprises a hitch-receiver insert portion located at an insertable end of the bar. The assembly can include a flexible securement pin or a rigid securement pin resiliently joined to the bar at a fixed distance from the engagement end of the pin. The assembly accommodates repetitive, same location positioning of the engagement end of the pin at a pin-tip facing surface on the bar in the pin-secured configuration of the insert bar assembly.

15 Claims, 7 Drawing Sheets

CARRIER INSERT BAR ASSEMBLY WITH SECUREMENT PIN

CROSS-REFERENCE TO RELATED APPLICATION

This application claims priority to U.S. Provisional Application No. 61/513,979, filed Aug. 1, 2011, which is fully incorporated by reference herein.

FIELD OF THE TECHNOLOGY

The present disclosure relates generally to an insert bar assembly for a hitch-rack load carrier. More specifically, embodiments within this disclosure relate to an insert bar assembly for a hitch-rack load carrier having a self-locating securement pin for repetitive, same location positioning, of an engagement end of the pin.

BACKGROUND OF THE TECHNOLOGY

Safely transporting sports equipment is a concern for many sports enthusiasts. For example, transporting a bicycle by automobile has many safety concerns. If a bicycle rack were to become disconnected from a vehicle while driving it could damage the rack and a bicycle being transported and affect the safety of other motorists. One way to secure a rack to a vehicle is to insert an insert bar into a hitch on the vehicle and insert a pin through corresponding holes in the insert bar and the hitch. Depending on the strength of the person attaching the rack, the weight of the rack, and other environmental conditions, it can be difficult to secure the rack with the pin. Various embodiments of the technology enable a pin to easily and securely attach a rack to a hitch.

Sometimes a receiver on a vehicle hitch is larger than the insert portion of a carrier rack. For example, a hitch-rack load carrier may be 1.25 square inches at its lead-in end, while the corresponding aperture on the hitch might be 2 square inches. Various embodiments of the technology pertain to a hitch assembly with an expander to enable a suitable connection between a hitch and a carrier. Various embodiments of the technology pertain to an adapter assembly which can enable a suitable connection between a hitch and a carrier.

BRIEF DESCRIPTION OF THE DRAWINGS

Implementations of the present application will now be described, by way of example only, with reference to the attached figures, wherein.

DETAILED DESCRIPTION

Figure 1:
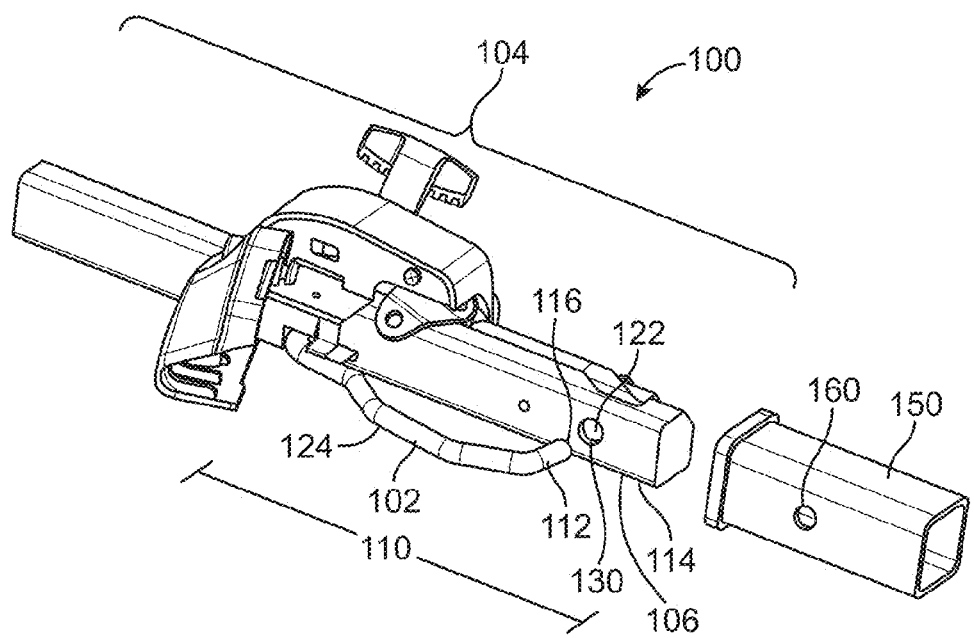
FIG. 1 is a perspective view of an insert bar for a hitch-rack load carrier in accordance with an example embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. Also, the description is not to be considered as limiting the scope of the implementations described herein.

Within the technology, an insert bar assembly for a hitch-rack load carrier can comprise a self-locating securement pin. The securement pin can be configured to have a tip-fixed position in a pin-secured configuration of the insert bar assembly. The insert bar assembly can incorporate an elongate hitch-attachment bar having a hitch-receiver insert portion which is located at an insertable end of the bar. The assembly can include a flexible securement pin or a rigid securement pin which is coupled via a hinge-device or other suitable means to the bar at an unchanging distance from the engagement end of the pin. The assembly can be configured to enable or accommodate repetitive, same location positioning of the engaging end of the securement pin on the bar 104 when the assembly is in a pin-secured configuration of the insert bar assembly.

Within the technology, a hitch assembly can be configured with an expander to enable a suitable connection between a hitch and a carrier.

Within the technology an adapter assembly can be configured to enable a suitable connection between a hitch and a carrier.

Referring to FIG. 1, a perspective view of an insert bar assembly for a hitch-rack load carrier in accordance with an example embodiment is illustrated. The illustrated assembly 100 is not secured to the hitch 150. As shown, the insert bar assembly 100 can comprise a self-locating pin 102 for securing the insert bar assembly 100 of a carrier (not shown) to a hitch 150 of a vehicle (not shown). The pin can be made of flexible or inflexible material. The insert assembly 100 can further comprise an elongate hitch-attachment bar 104 with a hitch-receiver insert portion 106 located at an insertable end 114 of the bar 104. The insertable end 114 can be configured to be inserted into a receiving end of the hitch 150. The insert assembly 100 can further comprise a securement pin 102 coupled to the bar 104 at a fixed distance 110 from an engagement end 112 of the pin 102 which accommodates or enables repetitive, same location positioning of the engagement end 112 of the pin when the assembly 100 is in a pin-secured configuration. The tip 116 of the securement pin 102 can be biased towards the hitch attachment bar 104 via a spring or other suitable means located within a space interior of the insert bar assembly 100. The attachment assembly 100 and thereby the carrier rack (not shown) can be releasably attached to the hitch 150 when the engagement end 112 of the pin 102 is received by an aperture 160 in the hitch 150. The securement pin 102 can be resiliently joined to the bar 104 such as by a flexible joint or other suitable mechanism which enables the securement pin 102 to flex toward bar 104. The securement pin 102 can be coupled to the bar 104 via a hinge (not shown) or other suitable means to enable it to be laterally translatable with respect to the bar 104. The pin 102 can thus be pivotally coupled to the bar 104 at a fixed distance 110 from an engagement end 112 of the pin 102. The engagement end 112 of the pin 102 can comprise a pin-tip 116 which may engage a pin-tip engagement surface 120 of the bar 104 or a pin-tip engagement area (e.g. 160) on a hitch or both. The pin-tip engagement surface 120 can include a pin-tip receiver 122 which can be an intent or hole or depression in the bar 104. As illustrated in FIG. 1, the elongate hitch-attachment bar 104 can comprise a hitch-receiver insert portion 106 located at an end 114 of the bar 104 insertable into a hitch 150.

Figure 1A:
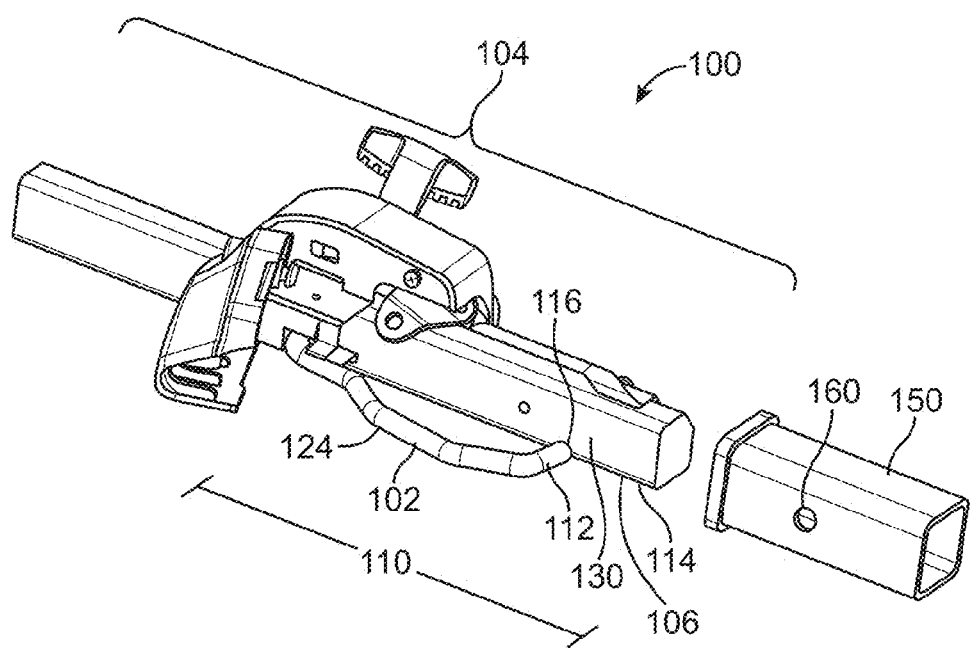
FIG. 1A is an internal view of an insert bar for a hitch-rack load carrier in accordance with an example embodiment

Referring to FIG. 1A, an alternate perspective view of an insert bar assembly for a hitch-rack load carrier in accordance with an example embodiment is illustrated. As was the case with FIG. 1, the illustrated assembly 100 is not secured to the hitch 150. The insertable end 114 of the attachment bar 104 can be configured to be fit within a hitch 150 on a vehicle (not shown). The insert assembly 100 can further comprise a securement pin 102 coupled to the bar 104 at a fixed distance 110 from an engagement end 112 of the pin 102 which accommodates or enables repetitive, same location positioning of the engagement end 112 of the pin when the assembly 100 is in a pin-secured configuration. The tip 116 of the securement pin 102 can be biased towards the hitch attachment bar 104 via a spring or other suitable means located within a space 201 interior of the insert bar assembly 100 (see FIG. 2). A pin-tip point of contact 130 can be located on the insertable end 114 of the bar 104 and the engagement end 112 of the pin 102, with a pin-tip 116 abuttingly engaging the pin-tip point of contact 130 located on the insertable end 114 of the bar 104. The pin-tip point of contact 130 located on the insertable end 114 of the bar 104 can consist of a recess, detent, indent, depression, concave area, convex area or flat surface (as shown in FIG. 1A).

Figure 2:
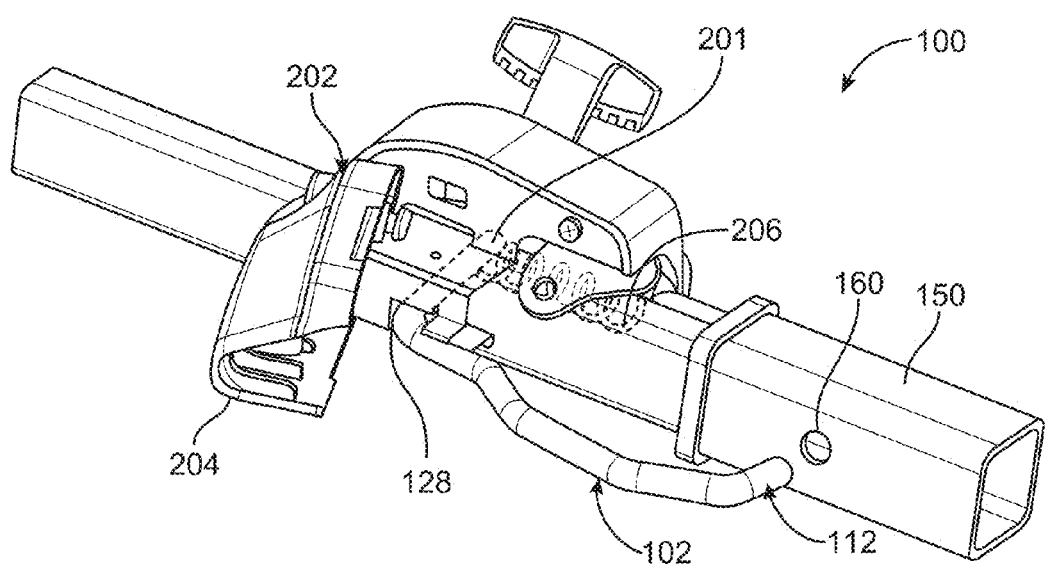
FIG. 2 is a perspective view of an insert bar for a hitch-rack load carrier in accordance with an example embodiment.

Referring to FIG. 2, an internal perspective view showing of an insert bar for a hitch-rack load carrier in accordance with an example embodiment is illustrated. The illustrated assembly 100 is not secured to the hitch 150. As illustrated in FIG. 1, the insert bar assembly can comprise a self-locating securement pin 102 having a tip-fixed position. The assembly 100 can contain an elongate hitch-attachment bar 104 which comprises a hitch-receiver insert portion 106 located at a hitch-insertable end 114 of the bar 104. The assembly can also contain a rigid or flexible securement pin 102 which can be pivotally coupled to the bar 104 at a fixed distance 110 from an engagement end 112 of the pin 102. The assembly 100 can thereby accommodate repetitive, same location positioning of the engagement end 112 of the pin 102 when in a pin-secured configuration 302 of the insert bar assembly 100. The assembly can further comprise a biasing member 206 which can be engaged upon the securement pin 102. The biasing member, which can consist of a spring or other suitable means, can bias the pin 102 toward a pin-secured configuration. With further reference to FIG. 2, the assembly 100 can comprise a lock assembly 202 to prevent unauthorized removal of the assembly from the hitch 150. The lock assembly can include a cap cover 204 which can cover the securement pin 102 in a pin-secured configuration, thereby preventing unauthorized movement of bar assembly 100 when the assembly is in a pin-secured configuration and attached to a hitch 150.

Figure 3:
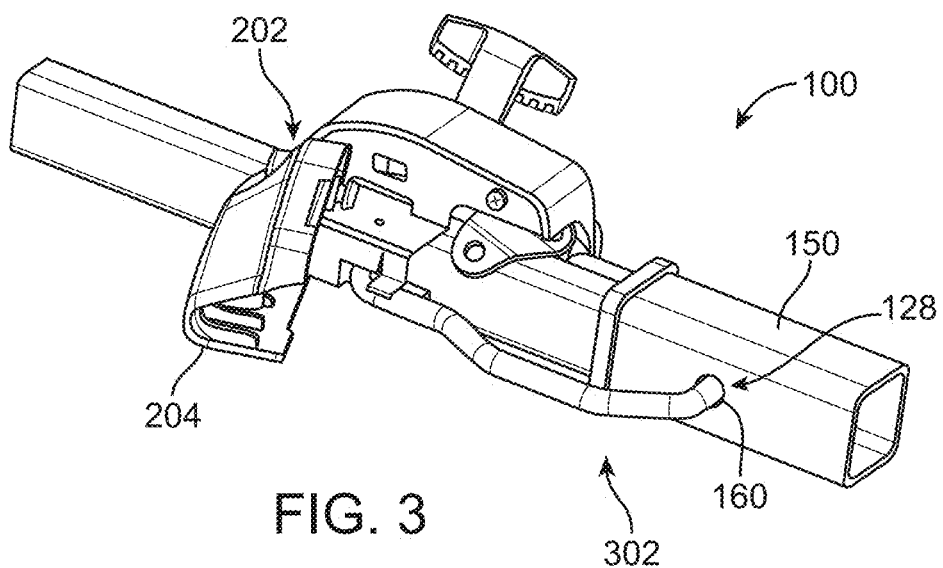
FIG. 3 is a perspective view of an insert bar for a hitch-rack load carrier in accordance with an example embodiment.

Referring to FIG. 3, a perspective view of an insert bar assembly for a hitch-rack load carrier in accordance with an example embodiment is illustrated. The assembly 100 is shown in a pin-secured configuration 302. The pin 102 is shown in a tip-fixed position 300 relative the assembly 100 as in the other Figs. However the tip-fixed position 300 in FIG. 3 corresponds to the pin-secured configuration 302 illustrated. Although the assembly 100 and the pin 102 are in a pin-secured configuration 302, the assembly 100 is not in a locked configuration because the cap-cover 204 of the lock assembly 202 is not shielding the coupled end 128 (of the securement pin 102 from contact.

Figure 4:
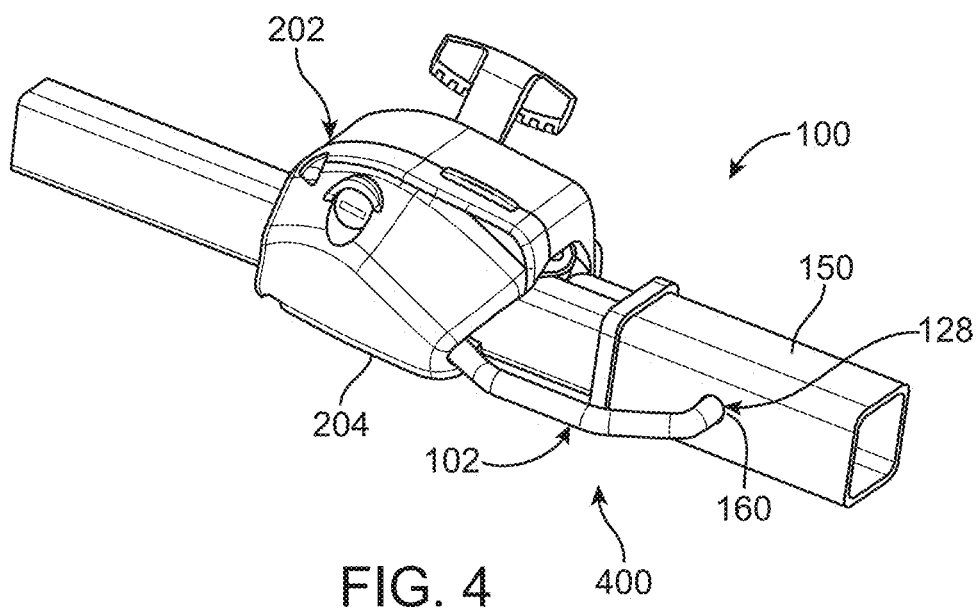
FIG. 4 is a perspective view of an insert bar for a hitch-rack load carrier in a locked configuration in accordance with an example embodiment.

Referring to FIG. 4, a perspective view of an insert bar assembly for a hitch-rack load carrier in accordance with an example embodiment is illustrated. The assembly 100 is shown in a pin-secured configuration 302 and in a locked configuration 400. The pin 102 is shown in a tip-fixed position 300 relative the assembly 100 as in the other Figs. As illustrated in FIG. 3, the tip-fixed position 300 illustrated in FIG. 4 corresponds to a pin-secured configuration 302. The assembly 100 and the pin 102 are in a pin-secured configuration 302, and the assembly is in a locked configuration 400 because the cap-cover 204 of the lock assembly 202 shields the coupled end 116 (not visible) of the securement pin 102 from contact. The assembly 100 can comprise a lock assembly 202. The assembly 100 or the lock assembly, or both, can be configured to allow pivoting of the cap cover 204 away from the bar 104 only, for example, if a key is inserted into a lock within the assembly 100 or if a combination is entered into a lock within the assembly 100.

Figure 5:
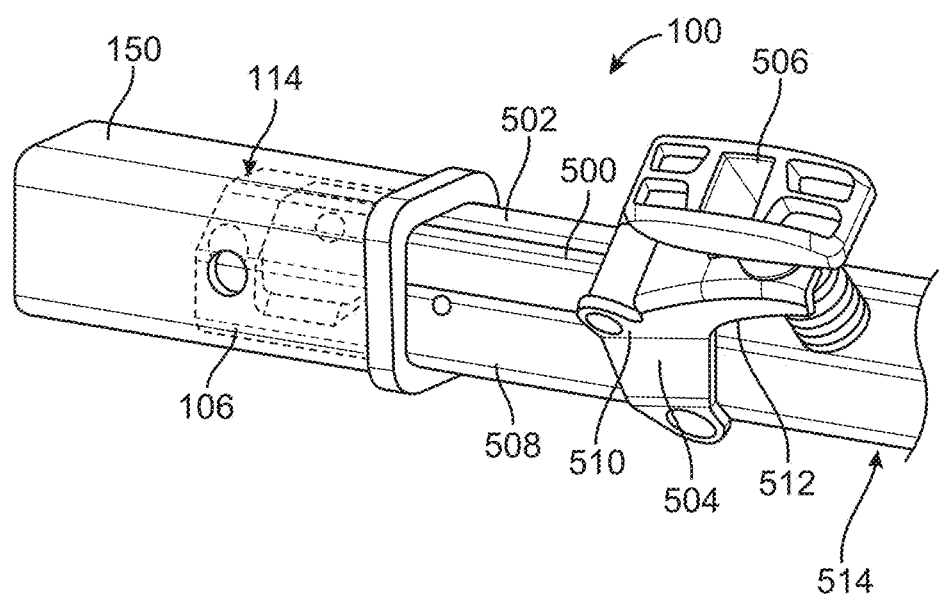
FIG. 5 is a perspective view of an insert bar for a hitch-rack load carrier in accordance with an example embodiment.

Referring to FIG. 5, a perspective view of an insert bar assembly for a hitch-rack load carrier in accordance with an example embodiment is illustrated. The insert bar assembly illustrated includes a leveraged, diagonally directed expander 500 for securing the insert bar assembly 100 in a receiver 150 of a hitch of a vehicle (not shown). The assembly 100 comprises an elongate hitch-attachment bar 104 which has a length, width and height, and a hitch-receiver insert portion 106 which is located proximate a lead-in end 114 of the bar 104. In order to accommodate attachment of the assembly 100 to a hitch which is larger than the insert portion 106 of the bar 104, the assembly 100 includes an expander 500. The expander 500 can be configured to extend and retract in relation to an exterior surface (e.g., 502) of the hitch attachment bar 104 in response to relative motion of the expander 500 on the bar 104. The expander 500 can be moved by a leveraging rocker-arm 504 on the assembly 100. The leveraging rocker-arm 504 can inter-couple the expander 500, the hitch-attachment bar 104 and a manually operable actuator 506, such as, for example, a knob, via a drive arm 512. The rocker-arm 504 can be configured for moving the expander 500 along the hitch-receiver insert portion 106 in response to manipulation of the actuator 506. In order to move the expander 500, a leveraging rocker-arm 504 pivots in a plane perpendicular to the exterior surface 502 of the hitch attachment bar 104.

Figure 6:
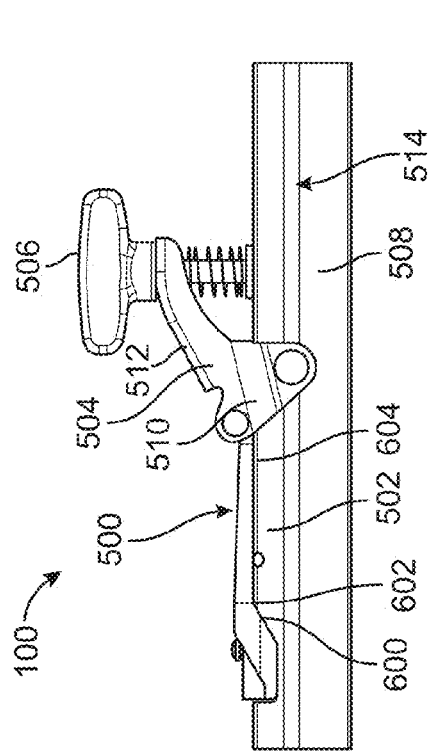
FIG. 6 is a side view of an insert bar for a hitch-rack load carrier in accordance with an example embodiment.

Referring to FIG. 6, a side view of an insert bar assembly for a hitch-rack load carrier in accordance with an example embodiment is illustrated. The assembly 100 is shown in non-expanded configuration. The side view of FIG. 6 is taken along a beveled corner running a substantial length of the body 508 of the attachment bar 104. The body 508 of the hitch-attachment bar 104 can be continuously solid along at least a majority of the length of the hitch-attachment bar 104. As explained with reference to FIG. 5, in order to accommodate attachment of the assembly 100 to a hitch which is larger than the insert portion 106 of the bar 104, the assembly 100 includes an expander 500. The expander 500 can be arranged to extend and retract relative to an exterior surface (e.g., 502) of the hitch attachment bar 104 in response to lateral motion of the expander 500 on the bar 104. The expander 500 can include a wedge-shaped lower surface 600 that abuttingly rests on a ramped exterior surface 602 of the hitch-receiver insert portion 106. When the wedge-shaped surface 600 is moved toward the actuator 506 in response to manipulation of the actuator 506 the expander 500 can move into a gap between the insert portion 106 and a hitch 150 (not shown).

Figure 7:
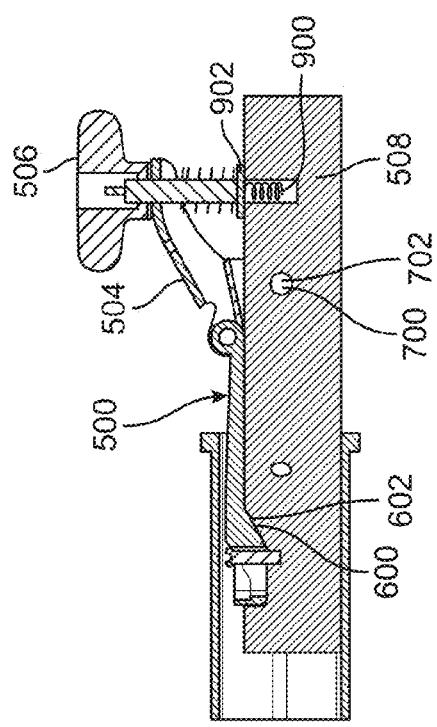
FIG. 7 is a cut-away side view of an insert bar for a hitch-rack load carrier in accordance with an example embodiment.

Referring to FIG. 7, a cut-away side view of an insert bar assembly for a hitch-rack load carrier in accordance with an example embodiment is illustrated. The assembly 100 is shown in a non-expanded configuration. The hitch attachment bar 104 can be predominantly rectangularly shaped at the hitch-receiver insert portion 106 in cross-sections taken perpendicularly to the length of the bar 104. The hitch attachment bar 104 has a beveled corner 604 which constitutes a diagonally outwardly facing exterior surface 602 upon which the ramped exterior surface 600 of the hitch attachment bar 104 is located. In order to enable movement of the expander 500, the leveraging rocker-arm 504 can pivot on a pivot axis 700 which is substantially parallel to the outward diagonally facing exterior surface 502 of the hitch attachment bar 104. Alternatively, the leveraging rocker-arm 504 can be configured to pivot in a plane perpendicular to the diagonally outwardly facing exterior surface 502 of the hitch attachment bar 104. The axis 700 can be formed by a pivot axle 702 extending across the hitch-attachment bar 104 and intersecting diagonal corners 514 of the hitch-attachment bar 104 (see FIGS. 5 and 6). Thus the leveraging rocker-arm 504 can be configured to pivot on the pivot axle 702 thereby causing extension of the expander 500 into a recess in a hitch assembly on a vehicle (not shown).

Figure 8:
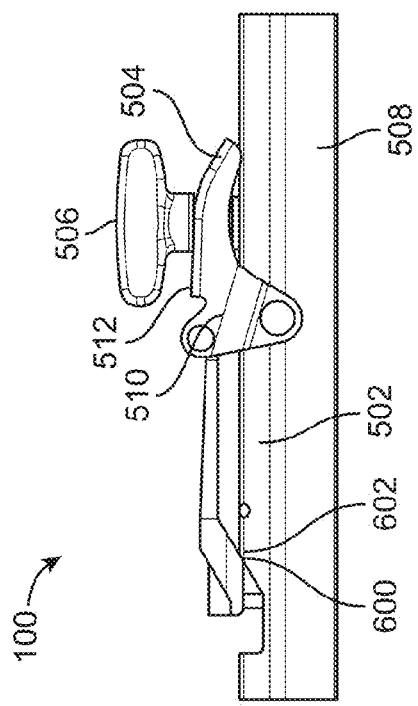
FIG. 8 is a side view of an insert bar for a hitch-rack load carrier in an expanded configuration accordance with an example embodiment.

Referring to FIG. 8, a side view of an insert bar assembly for a hitch-rack load carrier in accordance with an example embodiment is illustrated. The assembly 100 is shown in an expanded configuration in which a lower surface 600 of an expander 500 has been moved relative the attachment bar 104 in order that the expander 500 can adapt the assembly 100 to attach to a hitch 150 (not shown) which has a receiving portion which is larger in height or width (or both) than the insert portion 106 of the assembly 100. As discussed above, the hitch-attachment bar 104 at the hitch-receiver insert portion 106 can be predominantly rectangularly shaped in cross-sections taken perpendicular to the length of the bar 104. The hitch attachment bar 104 can include a beveled corner 604 constituting a diagonal exterior surface (502) which faces outwardly, and on which the ramped exterior surface 602 of the hitch-receiver insert portion 106 can be located. In at least one embodiment, the hitch-attachment bar 104 at the hitch-receiver insert portion 106 can be shaped substantially like a pentagon in cross-sections taken perpendicularly to a length of the bar 104.

Figure 9:
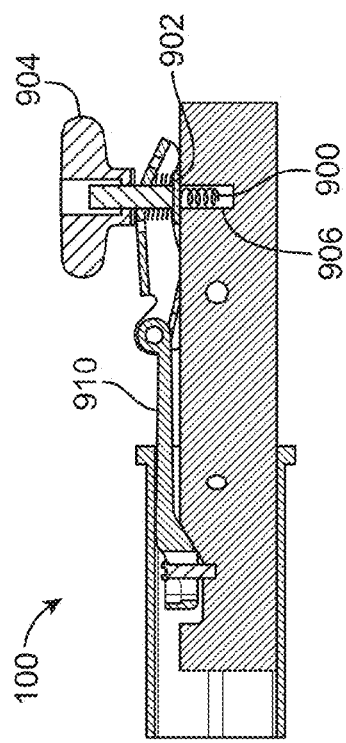
FIG. 9 is a cut-away side view of an insert bar for a hitch-rack load carrier in an expanded configuration accordance with an example embodiment.

Referring to FIG. 9, a cut-away side view of an insert bar assembly for a hitch-rack load carrier in accordance with an example embodiment is illustrated. As discussed above, the assembly 100 can comprise an actuator 506 for expanding the expander 500 relative the rest of the assembly 100. The manually operable actuator 506 can comprise a threaded bolt 900 which can be threadingly engaged in a threaded receiving aperture 902 perpendicularly extending into the diagonally outwardly facing exterior surface (502) of the bar 104. The actuator 506 can comprise a knob 904 or handle fixed upon the bolt 900. Rotation of the knob 904 in one direction causes advancement of the bolt 900 into the threaded receiving aperture 902 and rotation of the knob 904 in the opposite direction causes advancement of the bolt 900 out of the threaded receiving aperture 902. The bolt 900 can be configured to extend through an aperture in the drive arm 512 of the leveraging rocker-arm 504. As shown, the knob 904 can be located on the drive arm 512 on an opposite side of the elongate hitch-attachment bar 104. The link arm 510 of the leveraging rocker-arm 504 can be pivotally coupled to one end of an elongate extension rod 910 that is coupled at an opposite end to the expander 500.

Figure 10:
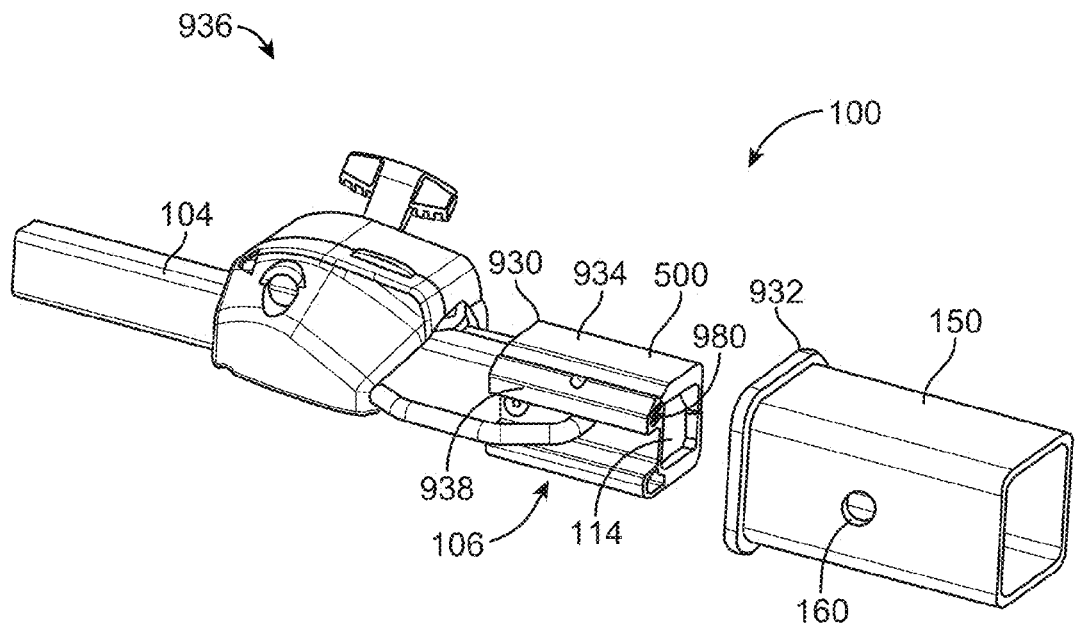
FIG. 10 is a perspective view of an adapter assembly for an insert bar assembly of a hitch-rack load carrier in accordance with an example embodiment.

Referring to FIG. 10, a perspective view of an adapter assembly for a hitch-rack load carrier having an adapter in accordance with an example embodiment is illustrated. As illustrated, an adapter assembly 930 for an insert bar assembly 100 of a hitch-rack load carrier which is sized for insertion into a 1.25 inch square tubular hitch receiver can be adapted for insertion into a 2 inch square tubular hitch receiver 932. The adapter assembly 930 can comprise an expandable adapter 934 which is mountable upon an elongate hitch-attachment bar 104. The bar can be substantially square in cross-sectional shape and sized for insertion into a 1.25 inch square tubular hitch receiver. The assembly 100 can include an expander 500 which diagonally extends and retracts relative to the bar 104. As shown, the adapter 934 can be configured to house or contain a hitch-receiver insert portion 106 in a collapsed configuration 936. The adapter 934 can comprise a main body 938 which has an interior space (not shown) defined by at least two substantially perpendicular interior walls not shown.

Figure 11:
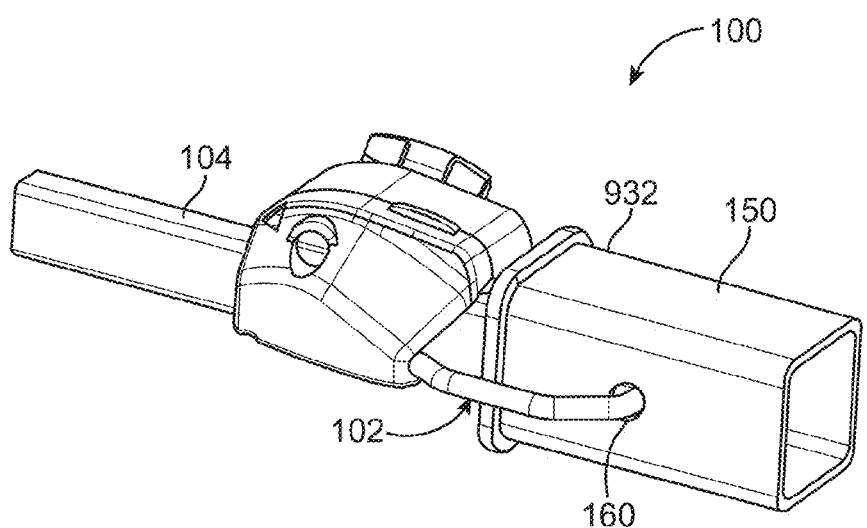
FIG. 11 is a perspective view of an insert bar for a hitch-rack load carrier received within a hitch in accordance with an example embodiment.

Referring to FIG. 11, a perspective view of an insert bar for a hitch-rack load carrier received within a hitch in accordance with an example embodiment is illustrated. The bar 104 of the assembly 100 is illustrated adaptively attached to a larger square tubular receiver 932 (e.g., 150). A pin 102 coupled to the attachment bar 104 is inserted within an aperture 160 on a vehicle hitch 150. Thus the carrier (not shown) is releasably coupled to the hitch 150.

Figure 12:
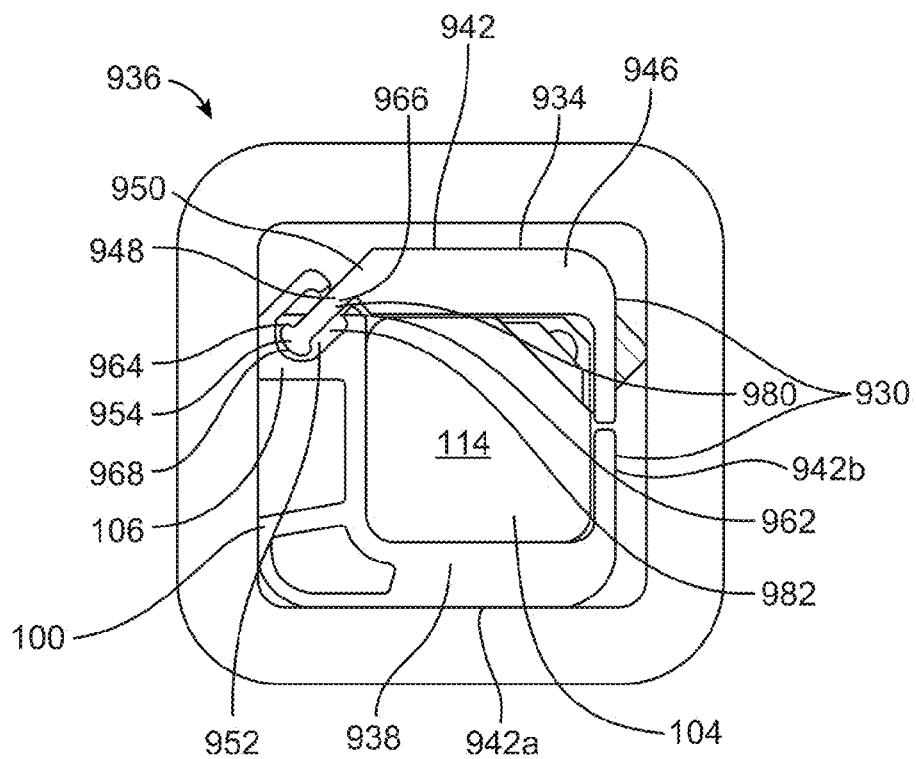
FIG. 12 is a cross-section of a hitch-rack load carrier received within a hitch in accordance with an example embodiment.

Referring to FIG. 12, a cross-section of hitch-rack load carrier received within a hitch in accordance with an example embodiment is illustrated. The adapter 934 of the carrier assembly 100 is shown in a collapsed configuration 936. An adapter assembly 930 of an insert bar assembly 100 for a hitch-rack load carrier which is designed for insertion into a 1.25 inch square tubular hitch receiver is adaptable for insertion into a 2 inch square (or smaller) tubular hitch receiver 932. The adapter assembly 930 can contain an expandable adapter 934 mountable upon the attachment bar 104 that is substantially square in cross-sectional shape and sized for insertion into a 1.25 inch square tubular hitch receiver. The adapter assembly 930 can comprise an expander 500 that diagonally extends and retracts in relation to the bar 104. The adapter 934 can house a hitch-receiver insert portion 106 of the bar 104 in the collapsed configuration 936. The adapter 934 can comprise a main body 938 which has an interior space (940) defined by at least two substantially perpendicular interior walls 942 which can be positioned adjacent to two exterior walls 944 of the hitch-receiver insert portion 106.

The adapter 934 can have an expansion member 946 which is coupled to the main body 938 by a coupling 948 that allows for expansion of the expansion member 946 away from the main body 938, thereby securing the insert bar assembly 100 to the hitch 150. The expansion member 946 can partially or wholly shroud the expander 500 during extension and retraction of the expander 500. In at least one embodiment, the coupling that couples the expansion member 946 to the main body 938 comprises an extension finger 950 which projects into a retention space 952 on the main body 938. The extension finger 950 can have a bulbous tip 954 which can be trapped by a restrictive neck of the retention space 952 on the main body 938.

Figure 13:
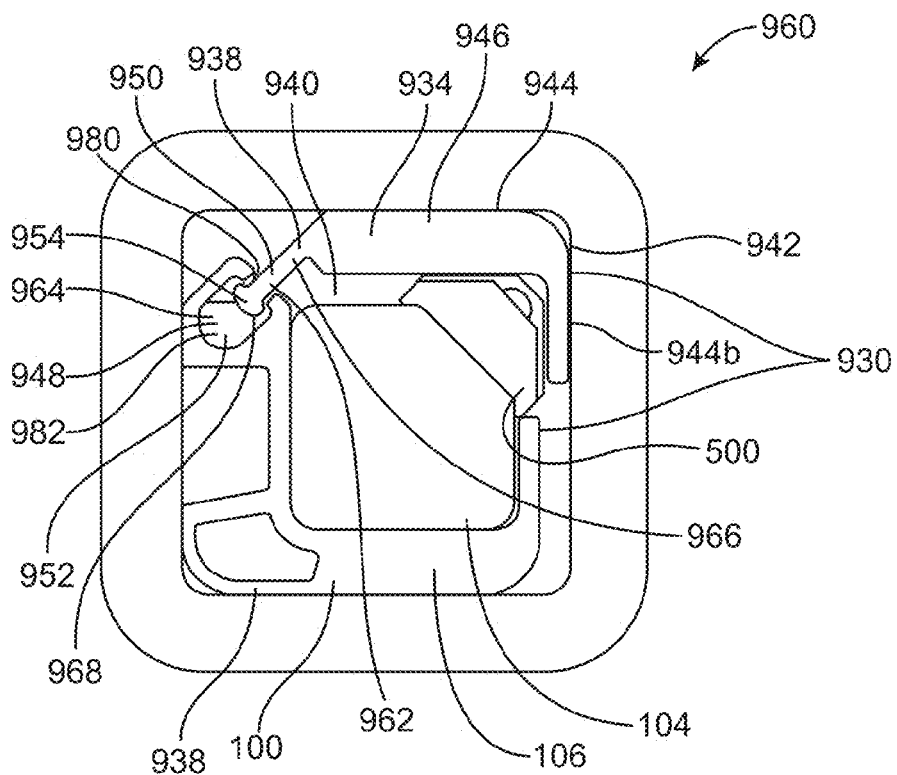
FIG. 13 is another cross-section of hitch-rack load carrier received within a hitch in accordance with an example embodiment.

Referring to FIG. 13, another cross-section of hitch-rack load carrier received within a hitch in accordance with an example embodiment is illustrated. In FIG. 13, the adapter 934 is shown in an uncollapsed or expanded configuration 960 wherein the expander 500 has been laterally translated towards the walls of the hitch. The center of the end of the attachment bar 104 remains centered within the hitch 150 in a collapsed configuration 936 and an expanded configuration 960. The coupling 948 of the adapter 934 that couples the expansion member 946 to its main body 938 can comprise an extension finger 950 on the expansion member 946 which projects into a retention space 952 on the main body 938. The extension finger 950 can be configured with a bulbous tip 954 which can be trapped in the retention space 952 by a restrictive neck in the retention space 952. The coupling 948 can comprise a restraining tongue-in-groove interconnection 952. A tongue 962 of the tongue-in-groove interconnection 952 can include an extension off of the expansion member 946 and into a groove 964 formed in the main body 938. Additionally, the tongue 962 is can comprise an elongate fin 966 which terminates in a bullnose 968 at a distal end of the fin 966. Furthermore, the groove 964 can comprise an elongate track 980 which ends in a necked access slot 982 at a distal end of the track 980.

Example implementations of the technology include an insert bar assembly 100 for a hitch-rack load carrier comprising a self-locating securement pin 102. The securement pin 102 can have a tip-fixed position 300 in a pin-secured configuration 302. As set forth above, embodiments of the insert bar assembly 100 can comprise an elongate hitch-attachment bar 104 which in turn comprises a hitch-receiver insert portion 106 located at an insertable end 114 of the bar 104. The assembly can also include a flexible securement pin 102 or a rigid securement pin 102 coupled to the bar 104 at a fixed distance 110 from the engagement end 112 of the pin 102. The assembly 100 can thereby accommodate repetitive, same location positioning of the engagement end 112 of the pin 102 (which can be a pin-tip 116) at a pin-tip facing surface 120 in the pin-secured configuration 302 of the insert bar assembly 100.

In at least one embodiment of the technology, an insert bar assembly 100 can include an elongate body 124 of a securement pin 102 having a substantially uniform cross-sectional area taken perpendicular to a lengthwise axis thereof between the engagement end 112 of the pin 102 and the location at which the pin 102 is coupled to the bar 104. In at least one embodiment the elongate body 124 of the securement pin 102 can have a non-straight lengthwise shape taken along the lengthwise axis of the bar 104.

In at least one embodiment of the technology, an insert bar assembly 100 houses a lock assembly 202 comprising a cap-cover 204 which can be pivotally mounted to the elongate hitch-attachment bar 104 that, when in a locked configuration 300, shields the coupled end 128 of the securement pin 102 from unauthorized contact or access.

In at least one embodiment of the technology, an insert bar assembly 100 for a hitch-rack load carrier has a leveraged, diagonally directed expander 500 for the purpose of securing the insert bar assembly 100 in a rectangularly shaped hitch receiver. The insert bar assembly can comprise an elongate hitch-attachment bar 104 having a length, width and height. The assembly 100 can comprise a hitch-receiver insert portion (106) located at or near a lead-in or insertable end 114 of the bar 104. The assembly can also contain an expander 500 which extends and retracts relative to an exterior surface 502 of the hitch-receiver insert portion 106 in response to relative motion of the expander 500 on the bar 104. The assembly 100 can further comprise a leveraging rocker-arm 504 or rocking-arm inter-coupling the expander 500, the hitch-attachment bar 104 and a manually operable actuator 506 for configured to move the expander 500 along the hitch-receiver insert portion 106 in response to manipulation of the actuator 506. Movement of the expander 500 can enable the assembly 100 to be attachable to hitches of varying size.

In at least one embodiment of the technology, an insert bar assembly 100 has a hitch-attachment bar 104 that has a body 508 that is continuously solid along at least a majority of the length of the hitch-attachment bar 104. The assembly can contain an expander 500 having a wedge-shaped lower surface 600 which abuttingly rests on a ramped exterior surface 602 of the hitch-receiver insert portion 106. The hitch-attachment bar 104 at the hitch-receiver insert portion 106 can be predominantly rectangularly shaped in cross-sections taken perpendicularly to the length of the bar 104. The hitch attachment bar 104 can comprise a beveled corner 604 which makes up a diagonally outwardly facing exterior surface 502 on which the ramped exterior surface 602 of the hitch-receiver insert portion 106 can be located.

In at least one embodiment of the technology, an assembly 100 can comprise a leveraging rocker-arm 504 which pivots on a pivot axis 700 which can be oriented substantially parallel to the diagonally outwardly facing exterior surface 502 of the bar 104. The leveraging rocker-arm 504 can contain a link arm 510 located toward the expander 500 from the pivot axle 702. The arm 504 can further contain a drive arm 512 which may be coupled to the link arm 510 located on an opposite side of the pivot axle 702 from the expander 500.

In at least one implementation of the technology, the manually operable actuator 506 further can comprise a threaded bolt 900 which can be threadingly engaged in a threaded receiving aperture 902. The aperture 902 can perpendicularly extend into the diagonally outwardly facing exterior surface 502 of the hitch attachment bar 104. The actuator 506 can comprise a knob 904 fixed upon the bolt 900. Rotation of the knob 904 in one direction can cause advancement of the bolt 900 into the threaded receiving aperture 902 and rotation of the knob 904 in the opposite direction can cause advancement of the bolt 900 out of the threaded receiving aperture 902. The bolt 900 can be configured to extend through an aperture in the drive arm 512 of the leveraging rocker-arm 504.

Example implementations of the technology set forth mechanisms by which an insertable end of a carrier rack assembly can be attached to a hitch which is not sized exactly the same as the insertable end of the carrier rack insert bar assembly. At least one implementation of the technology is an adapter assembly 930 for an insert bar assembly 100 of a hitch-rack load carrier sized for insertion into a first tubular hitch receiver having a first size but to be adapted for insertion into a second tubular hitch receiver 932 having a second, larger size. An adapter assembly 930 can have a main body 938 which is configured to house or hold an elongate hitch-attachment bar 104 which is substantially square in cross-sectional shape and sized for insertion into a first tubular hitch receiver. The adapter assembly can include an expansion member 946 coupled or connected to the main body 938 via a coupling 948. The coupling can accommodate or allow for or enable expansion of the expansion member 946 away from the main body 938 thereby enabling an insert bar assembly 100 to be fitted to a hitch with a receiving portion that is larger than that of the insert bar assembly 100. In at least one implementation of the technology, an adapter assembly can comprise a first tubular hitch receiver which is cross-sectionally square and has an interior space that is one and a quarter inch square and a second tubular hitch receiver which is cross-sectionally square and has an interior space that is two inch square. Other sizing variations fall within the scope of this disclosure.

Example implementations have been described hereinabove regarding various example embodiments. The example embodiments are intended to constitute non-limiting examples. The subject matter that is intended to be within this disclosure is set forth in the following claims.

The invention claimed is:

1. An insert bar assembly for a hitch-rack load carrier comprising a securement pin having a tip-fixed position in a pin-secured configuration, the insert bar assembly comprising:
    an elongate hitch-attachment bar comprising a hitch-receiver insert portion located at an insertable end of the bar; and
    a rigid securement pin resiliently joined to the bar at a fixed distance from an engagement end of the pin thereby accommodating repetitive, same location positioning of the engagement end of the pin in the pin-secured configuration of the insert bar assembly,
    wherein an elongate body of the securement pin has a substantially uniform cross-sectional area taken perpendicular to a lengthwise axis thereof between the engagement end of the pin and the location at which the pin is resiliently joined to the bar, and the elongate body of the securement pin has a non-straight lengthwise shape taken along that lengthwise axis.

2. The insert bar assembly recited in claim 1, further comprising:
    a pin-tip point of contact located on the insertable end of the bar; and
    the engagement end of the pin further comprising a pin-tip that abuttingly engages the pin-tip point of contact located on the insertable end of the bar in the pin-secured configuration of the insert bar assembly.

3. The insert bar assembly recited in claim 1, further comprising:
    a pin-tip facing surface located on the insertable end of the bar; and
    the engagement end of the pin further comprising a pin-tip that is located proximate to, and distanced from the pin-tip facing surface in the pin-secured configuration of the insert bar assembly.

4. The insert bar assembly recited in claim 1, further comprising:
    a pin-tip receiver located on the insertable end of the bar; and
    the engagement end of the pin further comprising a pin-tip matingly received in the pin-tip receiver in the pin-secured configuration of the insert bar assembly.

5. The insert bar assembly recited in claim 4, wherein the pin-tip receiver is a recess into the insertable end of the bar.

6. The insert bar assembly recited in claim 5, wherein an interior surface of the pin-tip receiver is complementarily shaped and sized to an exterior surface of the pin-tip of the engagement end of the pin.

7. The insert bar assembly recited in claim 6, wherein the pin-tip of the engagement end of the pin conformance fits within the pin-tip receiver in the pin-secured configuration.

8. The insert bar assembly recited in claim 1, wherein the elongate body of the securement pin is bowed outwardly away from the elongate hitch-attachment bar.

9. The insert bar assembly recited in claim 1, further comprising a lock assembly restraining the securement pin to the pin-secured configuration thereby preventing unauthorized movement of bar assembly in the pin-secured configuration.

10. The insert bar assembly recited in claim 9, wherein the lock assembly comprises a cap-cover pivotally mounted to the elongate hitch-attachment bar that in a locked configuration shields the coupled end of the securement pin from contact.

11. The insert bar assembly recited in claim 1, further comprising a biasing member engaged upon the securement pin that biases the pin to the pin-secured configuration.

12. The insert bar assembly recited in claim 11, wherein a bar-coupled end of the securement pin extends into an enclosed space proximate the elongate hitch-attachment bar and in which the biasing member is located, the biasing member engaging the bar-coupled end of the securement pin within that enclosed space.

13. The insert bar assembly recited in claim 1, wherein the rigid securement pin is resiliently joined to the bar by a pivotal coupling.

14. The insert bar assembly recited in claim 13, further comprising:
    a pin-tip point of contact located on the insertable end of the bar; and
    the engagement end of the pin further comprising a pin-tip that abuttingly engages the pin-tip point of contact located on the insertable end of the bar in the pin-secured configuration of the insert bar assembly.

15. The insert bar assembly recited in claim 13, further comprising:
    a pin-tip facing surface located on the insertable end of the bar; and
    the engagement end of the pin further comprising a pin-tip that is located proximate to, and distanced from the pin-tip facing surface in the pin-secured configuration of the insert bar assembly.

* * * * *